United States Patent [19]

Tsuchida et al.

[11] Patent Number: 4,802,521
[45] Date of Patent: * Feb. 7, 1989

[54] OVERHEAD BLIND

[75] Inventors: Eiharu Tsuchida, Tochio; Hisayoshi Nagasawa, Higashikubiki, both of Japan

[73] Assignee: Kuron Corporation, Niigata, Japan

[*] Notice: The portion of the term of this patent subsequent to Apr. 5, 2005 has been disclaimed.

[21] Appl. No.: 932,469

[22] Filed: Nov. 18, 1986

Related U.S. Application Data

[62] Division of Ser. No. 831,996, Feb. 20, 1986.

[30] Foreign Application Priority Data

Nov. 25, 1985 [JP] Japan .............................. 60-179881
Nov. 30, 1985 [JP] Japan .............................. 60-183653

[51] Int. Cl.$^4$ ................................................ E06B 9/30
[52] U.S. Cl. ...................................... 160/172; 160/236
[58] Field of Search .................. 160/172, DIG. 17, 1, 160/2, 7, 84 R, 236, 166 R, 107, 168 R, 176 R, 178 E, 176 B

[56] References Cited

U.S. PATENT DOCUMENTS

| | | | |
|---|---|---|---|
| 2,200,349 | 5/1940 | Walker | 160/236 X |
| 2,254,705 | 9/1941 | Morse | 160/236 X |
| 2,276,177 | 3/1942 | Flugger | 160/172 X |
| 2,481,714 | 9/1949 | Bezjian | 160/168 X |
| 3,022,549 | 2/1962 | Cummings | 160/107 X |
| 3,032,099 | 5/1962 | Croxen | 160/236 X |

Primary Examiner—Blair M. Johnson
Attorney, Agent, or Firm—Koda and Androlia

[57] ABSTRACT

An overhead blind in which not only the slats can be tilted, but also all of the slats can be shifted to open and close the blind which further includes a tilting control means and opening-and-closing control means for permitting tilting and opening-and-closing operations to be automatically controlled.

2 Claims, 10 Drawing Sheets

OVERHEAD BLIND

This is a division of application Ser. No. 831,996 filed Feb. 20, 1986.

BACKGROUND OF THE INVENTION

1. Technical Field

The invention relates to an overhead blind to be installed on a skylight or slanted window of a building (hereinafter referred to simply as an "overhead blind").

2. Prior Art

Conventionally an overhead blind is installed on a skylight or slanted window of a building, but the blind of the prior art was provided with a plurality of slats which were installed between an endless cord supported rotably by wheels at both ends, and the slats were swiveled to tilt at substantially predetermined locations by the action of the endless cord. However, in this construction, the slats always remained over the whole surface of the overhead window, thereby often causing insufficient lighting even when the slats opened, a narrow field of outdoor vision through the window, and discomfort from the shadows projected by the slats into the room. Other problems included were that the slats interrupted cleaning of the glass or other operations of the skylight from inside the room, rendering cleaning difficult.

BRIEF SUMMARY OF THE INVENTION

An object of the invention is to provide an overhead blind, wherein all the slats can be shifted to completely open or close the whole surface of a skylight as well as tilted at substantially predetermined locations to permit lighting through the blind, thereby resolving the problems mentioned above.

According to the invention, an overhead blind is provided, which, contrary to that of the prior art, can be completely opened, thereby admitting complete lighting through a skylight, widening the field of vision through the window, permitting easy cleaning of the window, and other advantages. Further, the operation can be motorized, the opening and closing motion can be automatically stopped and the operation can be remotely controlled, thereby permitting installation of the blind in high positions such as in a warehouse without creating difficulty in handling.

According to the invention, a sequence of operations can be automatically controlled by sending a slat "close" command from an automatic control device, wherein the slats are shifted to the closed position and thenafter tilted to close and shield the light.

Further, in the overhead blind of the invention, an opening-and-closing cord slidably remains at the positions where opening or closing is completed, and the degree of parallelism between the slats and the supporting frame is detected, so that the degree of parallelism between the slats and the supporting frame can easily be adjusted, ensuring parallel shifting of the slats.

In the invention a support cable tensioning device is used, wherein a resistive force against unwinding of a tensioned support cable can be reduced so that the construction of anchoring means can be simplified and made small and light. The slats used in the overhead blind of the invention prevent the tilt cord from disengaging the slats during opening and closing of the blind, and also substantially prevent clearance between each slat from occurring when the slats are closed at the predetermined position or laid flat, without reducing the strength of the slats.

According to the invention, an opening-and-closing drive pulley may grip and rotatably drive an opening-and-closing string so that it is unnecessary to use a special cord for the opening-and-closing cord, but an ordinary cord can be used without any risk of its being severed. The arrangement also permits easy adjustment of the degree of parallelism of the slats when opening and closing are stopped.

The opening-and-closing member of the invention has high strength per se while being light in weight, resulting in easy functioning of the member, and additionally permits a tubular portion forming the axial body thereof to be utilized as a slidable part for the tilt cord. Further, the member facilitates proper and easy threading of the opening-and-closing cord by utilizing the engagement portions at both upper and lower endo and cord fastening means, and permits linked motion with the slats by being connected with the tilt cord, resulting in a balanced configuration of the slats which remarkably improves the esthetic appearance of the blind.

DETAILED DESCRIPTION OF THE INVENTION

The invention will now be described in detail, by way of examples only, with reference to the drawings.

Figure 1:
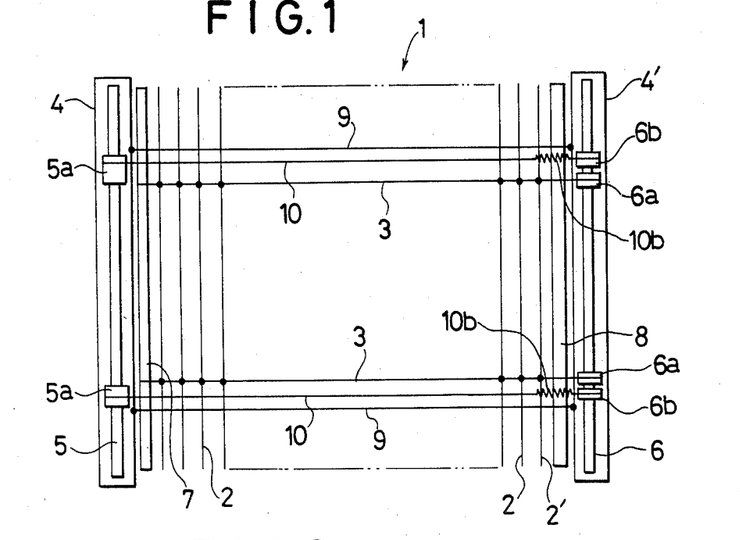
FIG. 1 is a top plan view of an embodiment of the invention.

In FIG. 1 showing an embodiment of the invention, an overhead blind 1 has a plurality of endless tilt cords 3 which hold both ends of a plurality of slats 2 parallel and substantially equally spaced, the number of cords depending on the width of the blind. The relative positions of slats 2 to the tilt cords 3 are substantially fixed. Two frames 4,4' are spaced apart by the length of the skylight 30 and secured to the roof 31 through brackets 31a. In the frame 4 is disposed an opening-and-closing shaft 5, and in the frame 4' is disposed a tilt shaft 6, both shafts being turned or rotated by driving means (not shown). Along the slat 2 side of the frame 4 is disposed an opening-and-closing member 7, and along the slat 2 side of the other frame 4' is disposed an open-and-closed detecting member 8. One end of the tilt cords 3 is supported by the opening-and-closing member 7, and the other end thereof is supported by a tilt pulley 6a mounted on the tilt shaft 6, so that the tilt cords 3 are moved by the rotation of the tilt shaft 6 to tilt the slats 2 at predetermined locations. Support cables 9 made of fine wire or piano wire pass through all of the slats 2 and both ends of the support cables 9 are secured to the frames 4,4'. At the portion where the support cables 9 pass through the slats 2 is provided a loose opening or the like which is elongated in the direction of tilting and formed so that the slats 2 do not tightly engage the support cables 9 when the slats 2 are tilted or shifted to the open or closed position. An opening-and-closing cord 10 is made endless, and engaged at one end by an opening-and-closing drive pulley 5a and at the other end by an opening-and-closing pulley 6b (idler) which is loosely fitted on a tilt shaft 6. The opening-and-closing cord 10 may, if necessary, be supported by a guide collar 10a. The opening-and-closing cord 10 and the opening-and-closing member 7 are connected to each other, for example, in such a manner that the opening-and-closing cord 10 and the opening-and-closing member 7 are caulked together after the cord 10 is passed through the member 7 and drawn to a predetermined location. The member 7 may, instead, be adjustable fastened to the cord 10 by means of a rivet or other fastener. The detection member 8 and the opening-and-closing cord 10 are independent of the support cables 9. Usually the number of tilt cords 3, support cables 9 and opening-and-closing cords 10 provided on one blind 1 is two or more depending on the width of the blind. Tension springs 10b may be interposed between each loop of the opening-and-closing cord 10 in such locations that they do not interfere with the opening-and-closing pulley 5a or the opening-and-closing idler pulley 6b, whereby elongation and contraction of the opening-and-closing cords can be absorbed, a predetermined frictional force can be applied to the drive pulley 5a, and also variation in the length of each opening-and-closing cord can be prevented.

The operation of the blind 1 will next be described. When the slats 2 are to be tilted at the predetermined locations, the tilt shaft 6 is turned manually, by an electrical motor or other means to move the tilt cord 3 through the tilt pulley 6a in the direction of arrow S so that the slats 2 and the tilt cord 3 are each moved to the positions 2' and 3' to close the blind 1. The slats may be tilted in the opposite direction in the same way by turning the tilt shaft 6 to move the tilt string 3 in the direction opposite the direction of arrow S.

Figure 3:
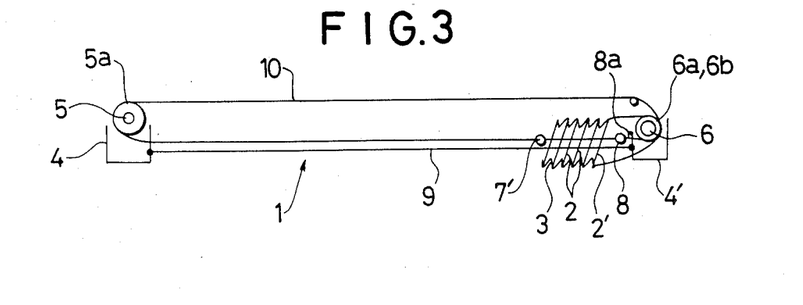
FIG. 3 shows a view similar to FIG. 2, but in the opened condition.

When the slats 2 are to be shifted to completely open the skylight 30, the opening-and-closing shaft 5 is rotated manually or electrically to move the opening-and-closing cord 10 through the opening-and-closing drive pulley 5a in the direction of arrow O. The opening-and-closing member 7 is thereby moved in the direction of arrow P to push the slats 2 until the member 7 reaches the position 7' shown in FIG. 3, the blind 1 then being almost fully opened. The slats 2 are prevented from drooping since the support cable 9 passes through all of the slats 2. A detecting member 8 is used, for example, to actuate a limit switch by detecting the completion of opening operation if done electrically. The slat 2' at the extreme end may be used as the detecting member.

Figure 4:
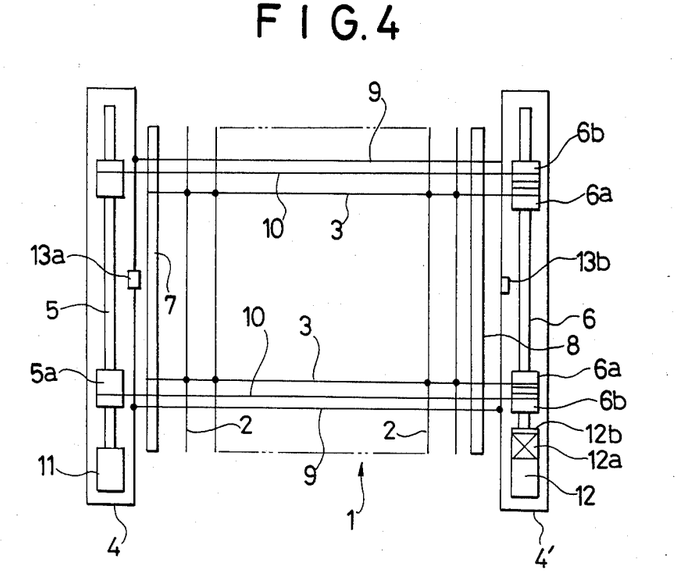
FIG. 4 is a top plan view of another embodiment of the invention.

FIG. 4 shown another embodiment of the invention. The slats 2, tilt cord 3, frames 4,4', opening-and-closing shaft 6, tilt pulley 6a, opening-and-closing idler pulley 6a, opening-and-closing member 7, detecting member 8, support cable 9 and opening-and-closing cord 10 are similar to those shown in FIGS. 1 and 2.

In the embodiment of FIG. 4, an opening-and-closing motor 11 is installed on the frame 4 to drive the opening-and-closing shaft 5. Also a tilt motor 12 and tilt limit switch 12a are installed on the frame 4' to actuate turning and stopping of the tilt shaft 6. An opening-and-closing end detector 13a is installed on the frame 4, and an opening-and-closing end detector 13b is installed on the frame 4'. An actuating element 12b is attached to the tilt shaft 6 to actuate the limit switch 12a in the predetermined open and closed positions of the slats 2.

The operation will now be described. When a command to drive the tilt motor 12 in either direction is supplied, the tilt motor 12 turns with the actuating element 12b to swivel the and slats 2 through the tilt spring 3 until the slats 2 reach either tilting extremity at the predetermined locations and the limit switch 12a is actuated through the actuating element 12b to stop the motor 12. If the driving command is terminated partway through the tilting, tilting stops at any desired angular position.

When an opening signal is supplied when blind 1 is closed, the opening-and-closing motor 11 rotates in the opening direction to push and stack up the slats 2 through the opening-and-closing member 7 until the slats 2 finish stacking and moves the detecting member 8 (to the right in the drawing) to stop the motor 11 by the interaction of the detecting member 8 and the opening-and-closing detector 13b. When the blind 1 is to be closed, the detecting member 8 is moved in the opposite direction by a returning element 8a (FIG. 3) and the opening-and-closing member 7 actuates the opening-and-closing detector 13a to stop the motor 11.

Operating commands can be sent to the tilt motor 12 and the opening-and-closing motor 11 from a control console which is connected directly to the blind through signal wires. Also remote control signals can be sent separately, for instance, by means described in patent application No. 59-60719/1984 or No. 59-60720/1984 filed by the applicant of the present invention. The remote control, if used, makes the handling of blinds which are installed on skylights at elevated locations particularly easy.

If magnetic sensors are used for the opening-and-closing detectors 13a, 13b and magnets are installed on the opening-and-closing member 7 and the detecting member 8 to actuate the magnetic sensors, the device becomes more compact.

Figure 5A:
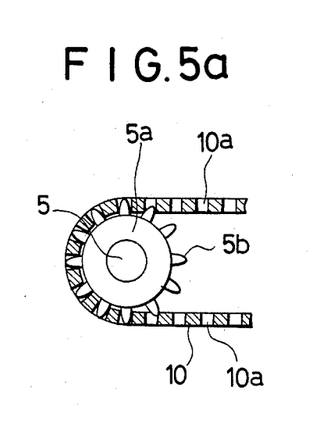
FIG. 5(a) and (b) are partial details of the embodiments of the invention.
Figure 5B:
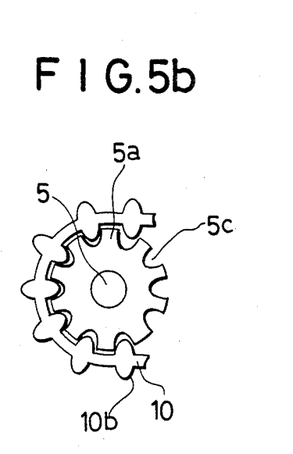

When the blind 1 is operated by the opening-and-closing member 7 through the opening-and-closing cord 10 driven by the opening-and-closing drive pulley 5a, the frictional force between the cord 10 and the pulley 5a may sometimes be insufficient to move the cord depending on the weight of the slats. In such a case, the movement of the opening-and-closing cord 10 and hence the opening-and-closing member 7 can be ensured by providing projections 5b and holes 10a, or concaves 5c and convexes 10b, on the pulley 5a and the cord 10, respectively. Alternatively, projections 5b on the pulley 5a may be configured to have a pointed shape which can penetrate the cord 10 which has a net or similar construction to permit the penetration of the projections. In case the blind is driven by an electric motor, a transformer is used as the power source means. If the tranformer capacity is divided in to a plurality of transformers of smaller capacity, the size of each transformer can be made small enough to be installed on the frames 4,4', thereby reducing the size of the frames to improve their esthetic appearance.

Figure 6:
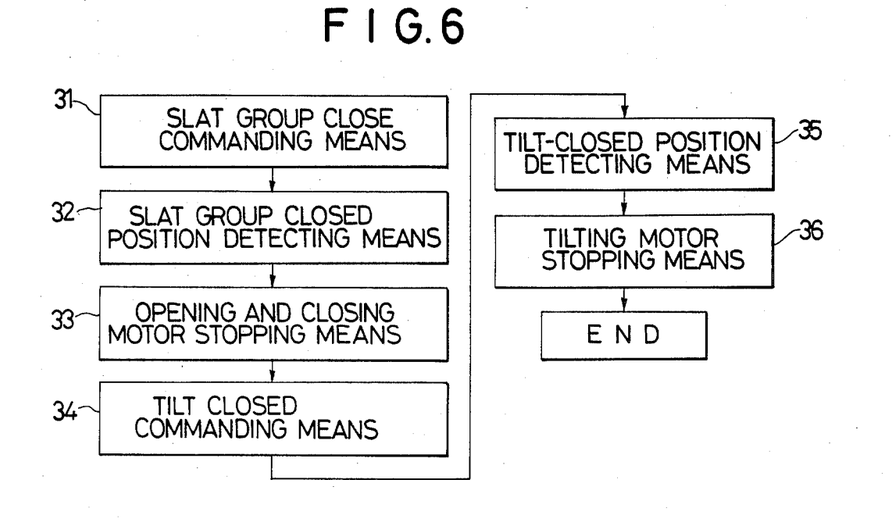
FIG. 6 is a block diagram of an example of the automatic control system used in the invention.

Next, an automatic control system will be described with reference to FIG. 6 which shows a block diagram of an embodiment of an automatic control system comprising slat-close commanding means 31, slat-closed-position detecting means 32, opening-and-closing motor stopping means 33, tilt-close commanding means 34, tilt-closed-position detecting means 35 and tilt motor stopping means 36.

Figure 7:
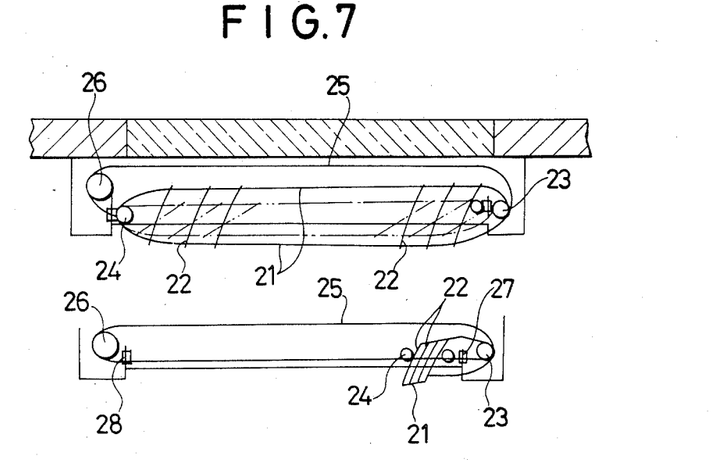
FIG. 7 is a schematic view showing the operation of the invention.

In case of closing the blind, when a slat-close command signal is sent from the slat-close commanding means 31, an opening-and-closing cord 25 (FIG. 7) operates to move the slats 22 to the positions in FIG. 7(b), and then this condition is detected by the slat closed-position detecting means 32 which stops the opening-and-closing motor through the opening-and-closing motor stopping means 33. Then the tilt-close commanding means 34 issues a command to swivel the slats 22 to the closed position, whereupon the tilt-closed-position detecting means 35 is actuated to stop the tilt motor through the tilt motor stopping means 36, thereby completing closure of the blind to shield the light. Opening of the blind can also be automatically carried out in the reverse order to the above.

The means of the embodiment described above are applicable not only to an overhead blind, but also to ordinary blinds of the vertical and horizontal type.

Figure 2:
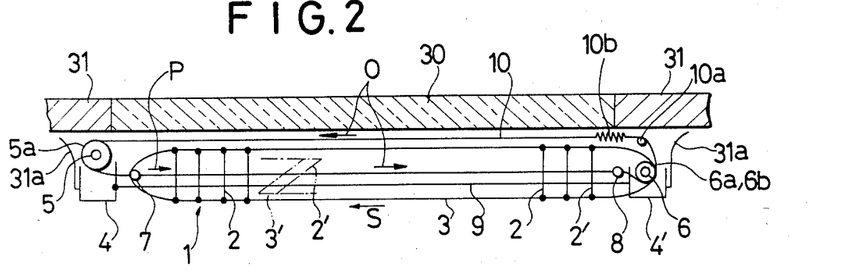
FIG. 2 is a side elevation of the embodiment of FIG. 1.

Next, the opening-and-closing mechanism of the invention will be described in detail, by way of an example, with reference to FIGS. 8 and 9 in which overhead blind 41, a plurality of slats 42, a plurality of tilt strings 43, frames 44,44', skylight 180, brackets 131a, roof 131, opening-and-closing detecting member 48, opening-and-closing member 47, tilt pulley 46a, tilt shaft 46, support cables 49, opening-and-closing cords 50, opening-and-closing shaft 45, opening-and-closing idler pulley 46b, opening-and-closing drive pulley 45a, and guide collars 50a are almost similar to those shown in FIGS. 1 and 2 in construction and operation.

The opening-and-closing shaft 45 engages an opening-and-closing motor 51 which drives the shaft 45, and the tilt shaft 46 engages a tilt motor 52 through a limit switch 52a and an actuating element 52b, and is driven and controlled by the motor 52.

A magnet 58 is installed at each end of the opening-and-closing member 47, and a sensor 54 is installed in the interior of the frame 44 opposite each magnet 58.

Figure 9:
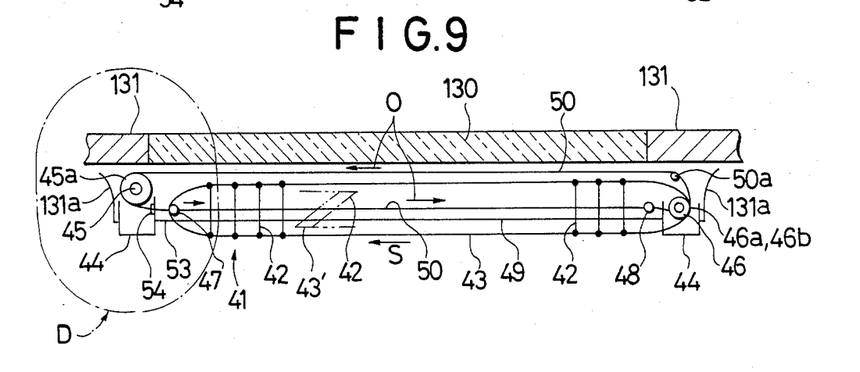
FIG. 9 is a side view of the embodiment of FIG. 8.
Figure 10:
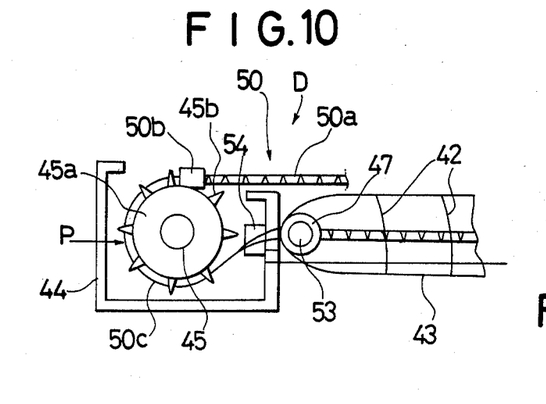
FIG. 10 is a partial detail view of the "D" portion of FIG. 9.
Figure 11:
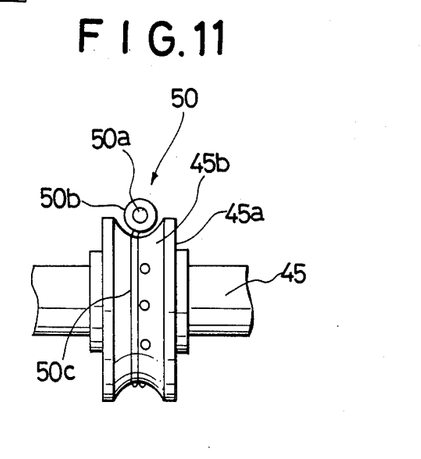
FIG. 11 is a view in the direction of arrow P in FIG. 10.

FIG. 10 shows section D of FIG. 9 in partial detail, which constitutes the main structure of the example. FIG. 11 shows a view in the direction of arrow P of FIG. 10. In these figures, the opening-and-closing cords 50 comprise an engaging cord portion 50a which has a net-like surface and an non-engaging cord portion 50C of wire rope which is connected at one end to the engaging cord portion 50a through a connector piece 50b and at the other end to the opening-and-closing member 47, wherein the length and arrangement of the non-engaging cord portion 50C is adapted so that the engaging cord portion 50a cannot engage the pointed projections 45b of the opening-and-closing drive pulley 45a after the slats 42 reach the location where closing operation is completed. The opening-and-closing drive pulley 45a is provided with a circumferential groove in which are disposed at its central portion 9 plurality of pointed projections 45b in the circumferential direction. These needle-like projections 45b engage the engaging cord portion 50a to move the opening-and-closing cord 50, but do not engage the non-engaging cord portion 50C, thereby allowing the pulley 45a to rotate idly when the non-engaging cord portion 50C is in contact with the pulley 45a.

The magnets 58 at both ends of the opening-and-closing member 47 are constructed to act on the sensors 54 on the frame 44 to cut off the power source (not shown) when the member 47 reaches the frame 44 at either end. A microswitch may be used in place of the magnet 58 and the sensor 54. On the detecting member 48 side of the blind in FIGS. 8 and 9, the arrangement can be made similar to the above. The slat 42' at the extreme end may be used as the detecting member 48.

Figure 8:
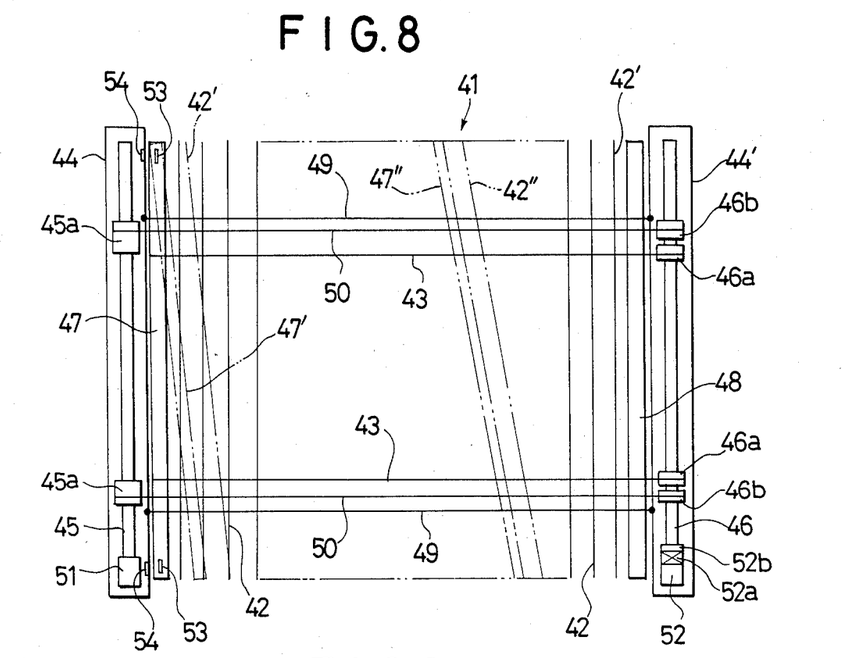
FIG. 8 is a plan view of the embodiment of the invention.

When opening-and-closing member 47" and slats 42" are in the diagonal position, as shown in FIG. 8 by the broken lines, the opening-and-closing string 50 is first moved by rotating the opening-and-closing drive pulley 45a, thereby bringing the opening-and-closing member to the position 47' and the slats to the position 42'. During this movement, the engaging cord portion 50a engages pointed projections 45b of the pulley 45a. As the opening-and-closing member 47' approaches the frame 44, the engaging cord portion 50a is disengaged from the pulley 45a, and the non-engaging cord portion 50c contacts the pulley 45a which can then rotate, whereby the parts of the opening-and-closing member 47 and the slats 42 in the upper portion of FIG. 8 are prevented from further movement. However, the parts of the opening-and-closing member 47' and the slats 42' in the lower portion of FIG. 8 continue to move by the engagement between the engaging cord portion 50a and the pointed projections 45b upto the positions of the member 47 and the slats 42. When the magnets 53 at both ends of the opening-and-closing member 47 approach the sensors 54 at either end of the frame 44, the power for driving is cut off, the opening-and-closing member 47 and the slats 42 are in normal aligned positions, i.e., parallel to the frame 44.

At the start of opening or closing of the slats 42, the opening-and-closing cord 50 is slightly moved by the friction between the peripheral surface of the pulley 45a and the non-engaging cord portion 50c made of wire rope, thereby bringing the pointed projections 45b of the pulley 45a and the engaging cord portion in engagement to move the opening-and-closing cord 50 in a normal way.

Now a support cable tensioning device of the invention will be described by way of an embodiment.

Figure 12:
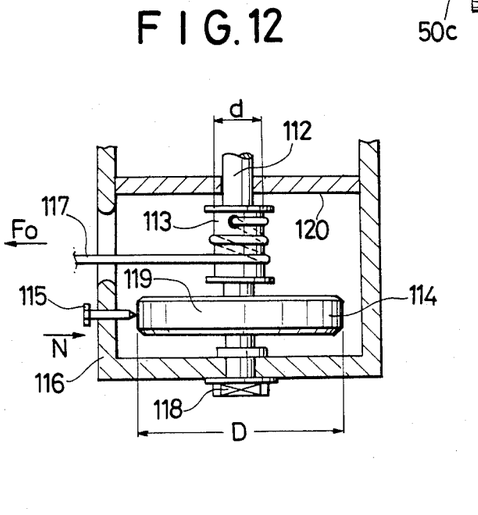
FIG. 12 shows schematically the construction of a support cable tensioning device.

FIG. 12 shows schematically the construction of the support cable tensioning device.

A cable winding-up drum body 113 having a diameter d and an anchoring drum 114 having a diameter D are coaxially and parallelly carried on a drum shaft 112 which is rotatably supported by a structural member 116 and a shaft support member 120. The support cable is secured to the winding-up drum body 113 in such a way that the end of a support cable 117 is inserted in a through-hole provided on the drum body and caulked with a small pipe (not shown) inserted therethrough. The periphery of the anchoring drum 114 having the diameter D substantially larger than the diameter of the drum body 113 is preferably formed with a shaped portion for anchoring, e.g., a number of antislip serrations 119, along its circumference. Anchoring members 115 which are engageable with the serrations 119 are supported by the structural member at the positions radially opposite to the serrations. On one or both ends of the drum shaft 112 is provided a winding tool engaging portion 118 for winding up or unwinding the support cable 117 on the drum body 113. In this embodiment the anchoring members 115 are screws which are attached appropriately spaced apart along the circumference of the anchoring drum 114 and movable in the axial direction thereof.

The operation will be described hereunder. In order to adjust the tension of the support cable 117, a turning tool is fitted on the tool engaging portion 118 to turn the winding-up drum body 113 in a desired direction (winding up or unwinding) until a desired tension is obtained, whereupon the anchoring members 115 are engaged with the serrations 119 on the anchoring drum 114, which has been turned together with the winding-up drum body 113, to anchor the drum 114.

Assuming the unwinding force (tension) of the cable 117 is $F_o$, and the anchoring force is N, the relation of torques may be expressed as:

$N$ (compressive or anchoring force of the anchoring member 115) $\times \mu$ (friction coefficient) $\times \frac{D}{2} \geq F_o \times \frac{d}{2}$ hence, $N \geq \frac{d}{\mu D} \times F_o$ Thus, if the difference in the diameter d of the drum body (small) and the diameter D of the anchoring drum (large) is made larger, the anchoring force N for the same amount of tension $F_o$ can be reduced accordingly.

Figures 13, 14, 15A, 15B:
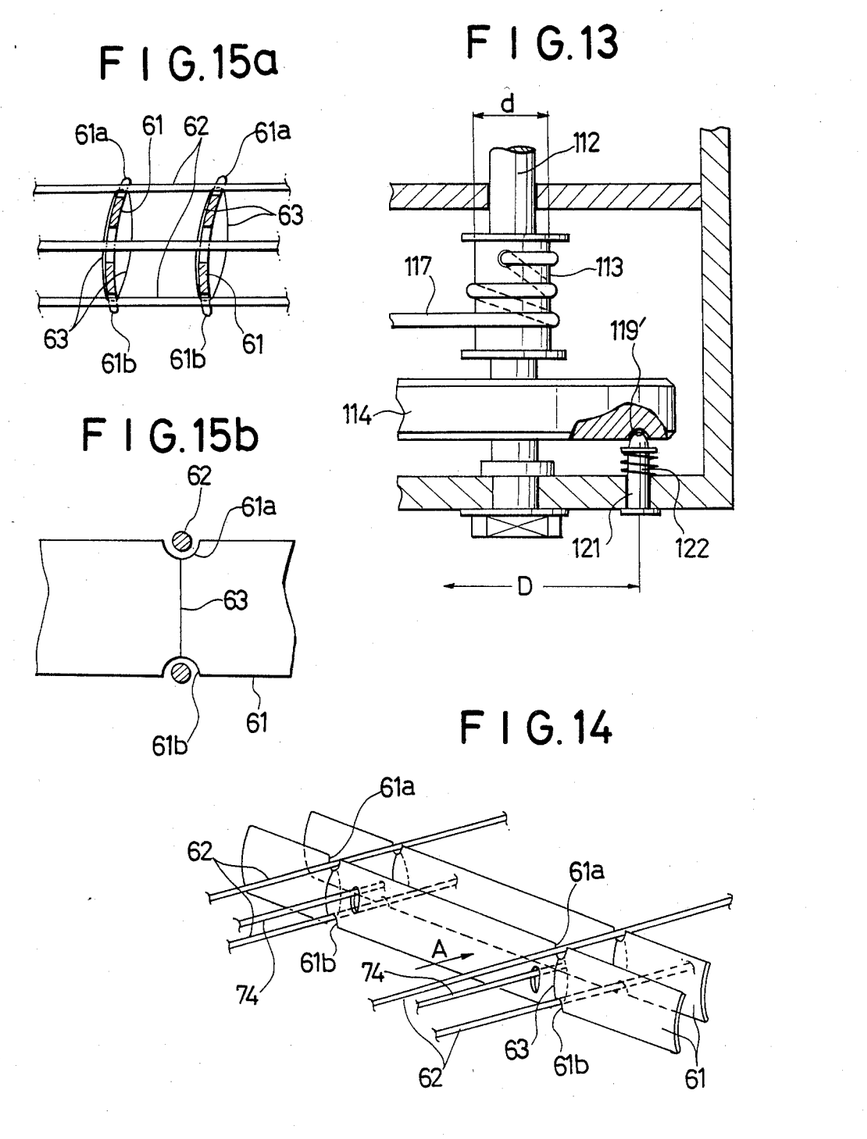
FIG. 13 shows a partially modified example of the device of FIG. 12.
FIG. 14 is a perspective of an example of slats.
FIG. 15(a) is a section of FIG. 1.
FIG. 15(b) is a partial view of FIG. 1 in the direction of arrow A.

Another example shown in FIG. 13 has the same main construction as the example in FIG. 12 except that on the side surface of the anchoring drum 114 at its radially outer part are provided shaped portions for anchoring 119', i.e., a plurality of concave portions in this embodiment, an anchoring member 121 being disposed opposite the concave portions and parallel to the drum axis. The anchroing member 121 may be made of the snap-engagement type, for instance, by interposing a spring 122 between the structural member and the anchoring member 121. The diameter of the array of engagement points (anchoring drum diameter in the example of FIG. 12 is equivalent to the pitch diameter D of the array of anchoring members 121 in this embodiment.

The operation of the device shown in FIG. 13 differs from that of FIG. 12 only in the engagement points between the anchoring drum 114 and the anchoring member 121, the function of the device being exactly the same as that of FIG. 12.

Various methods known in the art can be used for engagement means between the anchoring drum and the anchoring member other than shown in the figure. For example, a one- or two-way ratchet mechanism may be utilized.

Next, an embodiment of the slats of the invention will be described with reference to FIG. 14 which shows a perspective of an example of slats. FIG. 15(a) and (b) are a section and a view, respectively, in the direction of arrow A of FIG. 14. The arrangement of each slat 61 and driving means are almost the same as those of the prior art.

The slat 61 of the invention is generally formed with a plurality of upper cutaways 61a, 61a and/or lower cutaways 61b, 61b on its upper and/or lower edge, respectively. When both upper cutaways 61a, 61a and lower cutaways 61b, 61b are provided, each upper cutaway is formed in a transversely opposite position to each lower cutaway. Each cutaway 61a, 61b generally has a similar shape and dimension which make engagement with a tilt cord 62 possible so that the tilt cord 62 engages the slat 61 at this portion. Two lateral cords 63, 63 are connected between the upper and lower tilt cords 62, 62 at the position where the tilt cords engage cutaways 61a, 61b, the slat 61 being inserted between the latural cords 63, 63 and supported between the tilt cords 62, 62. The slat 61 is supported by a support cable 74 and opened or closed by opening-and-closing means (not shown).

When an overhead blind equipped with the slots 61 of the invention is being opened or closed, the tilt cord 62 does not slip out of the upper and lower cutaways 61a, 61b even if the tilt cord is slackened, since the tilt cord 62 is engaged with the upper and lower cutaways 61a, 61b of the slat 61.

Each cutaway 61a, 61b can be formed extremely simply and easily and also at reduced cost.

Generally, cutaways 61a, 61b are preferably provided on both upper and lower edges and, needless to say, on all of the slats. Further, it is of course preferable that the clearance between the lateral cords 63, 63 be narrowed as far as possible as shown in FIG. 15 so that the cords 63, 63 closely contact the slot to increase the engagement effect.

Figure 16:
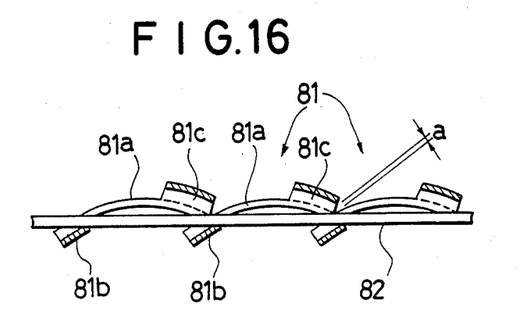
FIG. 16 is a section of another example of slats.
Figure 17:
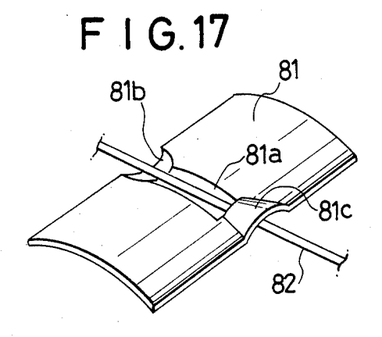
FIG. 17 is a partial perspective of FIG. 16.

Another embodiment of slat of the invention will be described with reference to FIGS. 16 and 17, which are a section and a perspective, respectively, of the embodiment of the invention. In these figures, an elongated hole 81a is formed on a slat 81 having an arcuate section, and a concave portion 81b and a convex portion 81c are formed integrally with the slat 81 adjacent to both ends of the elongated hole 81a. The concave portion 81b and the convex portion 81c each extend to the edge of the slat 81. A support cable 82 is passed loosely through the elongated hole 81a. When the slat 81 is swiveled to close at a predetermined location, a support cable 82 enters the concave portion 81b and the underside of convex portion 81c, and adjacent slats 81 abut each other at their adjacent edges, yielding almost no clearance a therebetween. Since the concave and convex portions 81b, 81c are integrally formed with the slat 81 adjacent to both ends of the elongated hole 81a they do not reduce the strength of the slat 81, which is also formed easily.

A drive pulley of the invention will now be described by way of other embodiments with reference.

Figure 18:
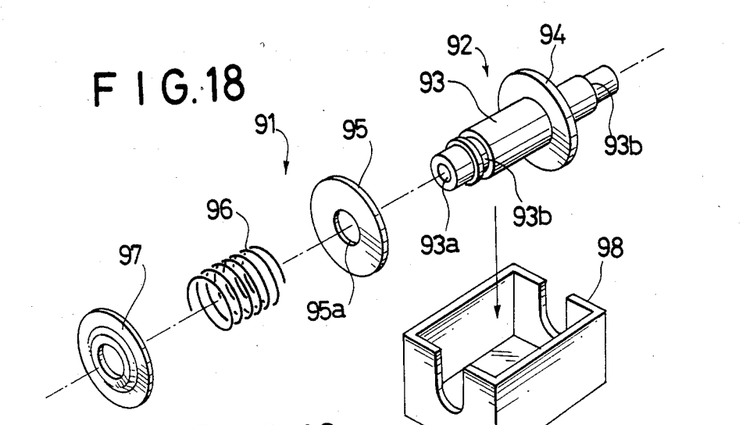
FIG. 18 is an exploded perspective of an example of a drive pulley.
Figure 19:
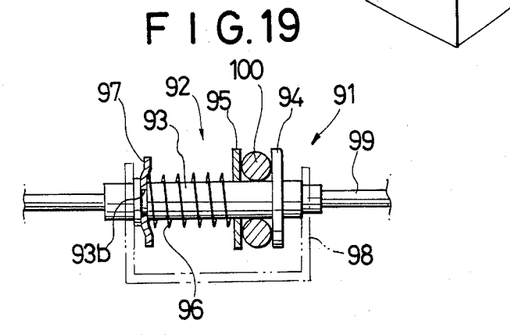
FIG. 19 is a partial section of FIG. 18.

FIG. 18 which is an exploded, perspective view of an embodiment of the invention, and to FIG. 19 which is a partial section of the embodiment of FIG. 18. Drive pulley 91 of the invention comprises a pulley body 92 which contains a main shaft 93 having a through, axial hole 93a bored through the center thereof, a fixed side wall 94 of the flange type integrally formed with the main shaft 93, and a stop groove 93b formed spaced apart axially from the fixed side wall 94. A main shaft hole 95a is formed on a disc-type movable wall 95 through its center, the wall 95 being slidably fitted on the main shaft 93. A coil spring 96 is loosely mounted on the main shaft between the movable wall 95 and a stop ring 97 which is fitted on the main shaft 92 so as to move the movable wall 95 toward the fixed wall 94. When the stop ring 97 is installed, its hole edge springs back to fit in the stop groove 93b, thereby being secured in position. A drive shaft 99 is inserted through and engaged with the shaft hole 93a of the main shaft 93. An opening-and-closing cord 100 is held between the fixed wall 94 and the movable wall 95.

Since the drive pulley 91 shifts the opening-and-closing cord 100 while holding the cord 100 between the fixed wall 94 and the movable wall 95 with the aid of the compressive force of the spring 96, it is unnecessary to use a special, net-type cord for the opening-and-closing cord 100. Also the holding force can be adjusted by changing the force of the spring 96 suitably. The cushioning force of rubber may be used in place of spring force. Since the pulley 91 can act as an idling mechanism while adjusting the degree of parallelism of the slats, it is unnecessary to combine a non-engaging cord portion with the cord 100.

Figure 20:
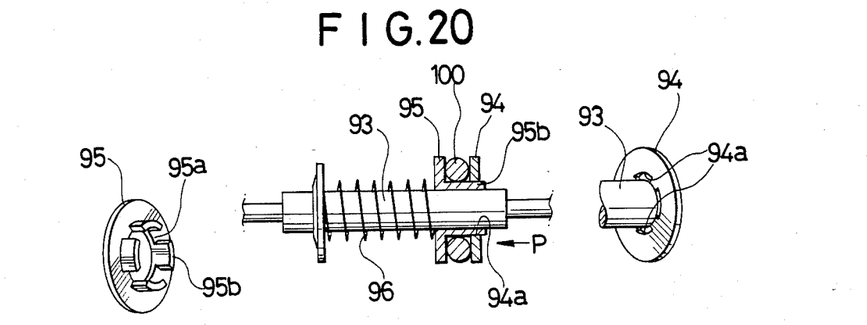
FIG. 20 is a partially exploded section of another example of a drive pulley.

FIG. 20 shows another embodiment wherein a plurality of engagement slats 94a are formed on the fixed wall 94 around the circumference of the main shaft 93, while a plurality of engagement projections 95b are formed on the movable wall 95 around the circumference of the mainshaft hole 95a in correspondence with the engagement slots 94a, the projections 95b and the slots 94a engaging each other to hold the opening-and-closing cord 100 between the two walls. In this condition, the engagement projections 95b protrude from the opposite surface of the fixed wall 94. In this construction, if the engagement projections 95b are pushed in the direction of arrow P, the movable wall 95 can easily be disengaged from the fixed wall 94, thereby facilitating the installation of the cord 100. Further, the engagement projections 95b existing over the surface of the main shaft 93 increase frictional force between the pulley 91 and the opening-and-closing cord 100, thereby increasing the driving force for opening and closing the blind.

Figure 21:
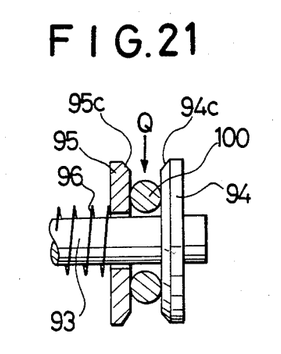
FIGS. 21 and 22 are partial sections of the third and fourth examples respectively, of a drive pulley.

FIG. 21 shows another embodiment wherein the opposing peripheral edges of the fixed wall 94 and the movable wall 95 are chamfered. This construction permits the opening-and-closing cord 100 to be easily installed by pushing it in the direction of arrow Q.

Figure 22:
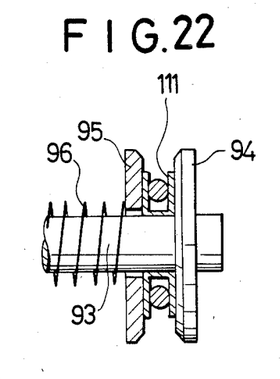
Figure 23:
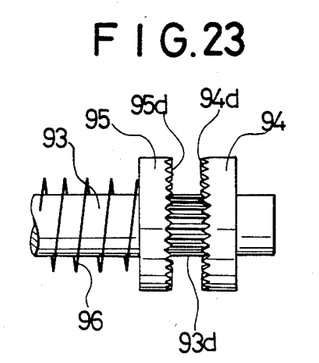
FIG. 23 is a partial side elevation of the fifth example of a drive pulley.

FIG. 22 shows still another embodiment wherein the opposing surfaces of the fixed wall 94 and the movable wall 95 and the surface of the main shaft 93 between the two walls are lined with a high friction material 111 such as rubber. FIG. 23 shows an embodiment wherein the opposing surfaces of the fixed wall 94 and the movable wall 95 and the surface of the main shaft 93 between the two walls are formed with faces of high friction 93d, 94d, 95d consisting of irregularities such as serrations, edges or knurls. The embodiments in FIGS. 22 and 23 make slipping of the opening-and-closing cord 100 difficult during application of a heavy load.

Figure 24:
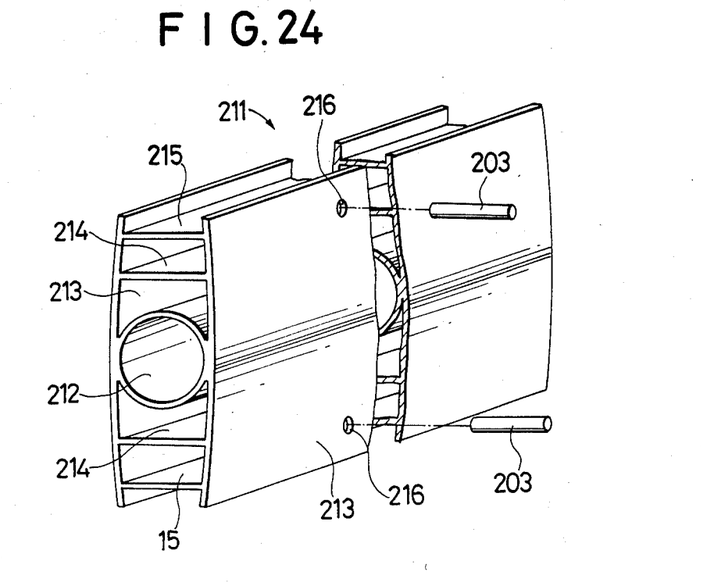
FIG. 24 is a perspective of an opening-and-closing member.

Now embodiments of the opening-and-closing member used in the invention will be described with reference to FIG. 24 which is a partially cut-off perspective of an opening-and-closing member for an overhead blind as an example of the invention. Member 211 is a long section member, comprising a tubular portion 212 which forms an axial body extending in the lengthwise direction in the center, a pair of side wall portions 213,213 which hold therebetween the outer surface of the tubular portion 212 and which form a quasi H-shape section with the tubular portion, and at least one pair of beam structures interconnecting the side wall portions, e.g., two pairs of beam structures 214,214; 215,215 in this embodiment. The tubular portion forming the axial body in the center of the opening-and-closing member can provide a tilt cord 203 with an arcuate guide when the string slidingly passes through the member 211. Further the generally flat sectional shape of the member provides extremely high rigidity as a beam compared with circular section members, leading to a consequential reduction in weight.

The opening-and-closing member is suitably formed of extraded aluminum.

Figure 25:
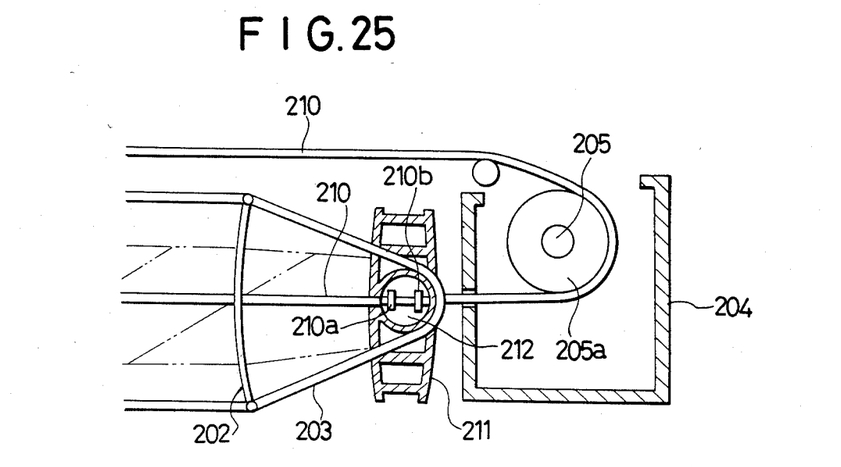
FIG. 25 is a view showing the practice of assembly of the member of FIG. 24 with a tilt cord and an opening-and-closing cord.
Figure 26:
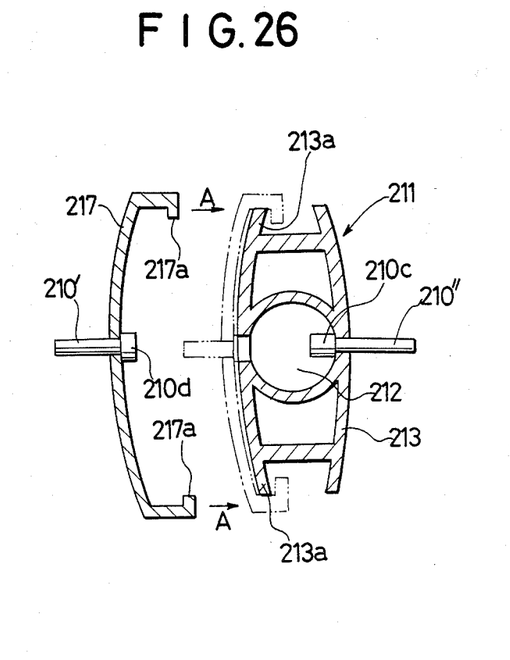
FIG. 26 is a view showing the installation of cord fastening means.

As shown in FIG. 25, the opening-and-closing member 211 and an opening-and-closing cord 210 are connected together in such a way that each end of the opening-and-closing cord 210 threaded through the opening-and-closing drive pulley 205a carried on an opening-and-closing shaft 205 is passed through the tubular portion 212 of the opening-and-closing member 211 and secured with fastening means 210a and 210b. Variations in tension may take place during usage due to deformation of parts, temperature changes in the string or other reasons, possibly making proper operation difficult in an extreme case. This problem can be resolved by using a cord fastener 217 as shown in FIG. 26. The opening-and-closing member is formed with engagement portions 213a,213a at its upper and lower edges. The cord fastener 217 made of an elastic material and having a laterally-elongated U-shaped section is formed with hooks 217a,217a at the ends of its two legs and has the left side end of opening-and-closing string 210' connected at the center of its web portion through fastening means 210d. Separately, the right side end of opening-and-closing string 210" is connected to the opening-and-closing member 211 through fastening means 210C. The cord fastener 217 in this condition is pushed against and over one side wall 213 as shown by arrow A, the hooks 217a,217a being snapped on the engagement portions 213a,213a to have the cord fastener 217 easily coupled to the side wall, as shown by the broken lines. Since the left and right side ends of the opening-and-closing string 210', 210" are individually connected to the cord fastner 217 and the opening-and-closing member, the connection is easily performed and adjustment of the tension of the string is also easily done.

Further the tilt cords 203,203 may be connected through openings 216,216 provided on the side wall 213 by utilizing small chambers formed by at least one pair of beam structures 214,214 (215,215) in the opening-and-closing member.

In the operation of an overhead blind using this type of opening-and-closing member, the tilt cords can be connected to the member 211 by the openings 216,216 for cord fastening means so that the opening-and-closing member follows the tilting action of the slats and tilts together with the slats, taking a tilted position parallel to the slats, thereby being configured in harmony with the slats, being arranged in order and improving the esthetic appearance.

What is claimed is:

1. An overhead blind of the type including a plurality of slats characterized in that said plurality of slats are provided and movable in a substantially horizontal direction, said blind comprises a means for tilting said plurality of slats and a means for shifting a group of slats to open and close the blind, at least one support cable for passing through said slats and preventing said slats from drooping, said means for tilting comprising a plurality of tilt cords which supports said slats at both edges thereof in parallel to and at a substantially equal distance from each other and each of said slats for the overhead blind is formed with cutaways engageable with said tilt strings.

2. An overhead blind as claimed in claim 1, characterized in that each of said slats for the overhead blind has an arcuate section and has bored transversely elongated openings through which said supporting cables are loosely passed, said each slat being formed with a concave portion which extends from one end of said opening to one edge of said slat and a convex portion which extends from the other end of said opening to the other edge of said slat.

* * * * *